United States Patent [19]

Touchette

[11] 3,959,064
[45] May 25, 1976

[54] TIRE BUILDING DRUM

[75] Inventor: John W. Touchette, Hartville, Ohio

[73] Assignee: The Goodyear Tire & Rubber Company, Akron, Ohio

[22] Filed: July 8, 1974

[21] Appl. No.: 486,718

[52] U.S. Cl. ............................. 156/417; 156/420
[51] Int. Cl.[2] ........................................ B29H 17/16
[58] Field of Search ............ 156/414, 415, 417, 420, 156/416, 418, 419

[56] References Cited
UNITED STATES PATENTS

| | | | |
|---|---|---|---|
| 2,603,581 | 7/1952 | Erickson et al. | 156/420 |
| 3,547,733 | 12/1970 | Leblond | 156/415 |
| 3,607,558 | 9/1971 | Nebout | 156/415 |
| 3,654,026 | 4/1972 | Brinkley | 156/420 |
| 3,740,293 | 6/1973 | Jones | 156/420 |
| 3,787,262 | 1/1974 | Appleby et al. | 156/420 |
| 3,833,444 | 9/1974 | Mallory | 156/417 |

FOREIGN PATENTS OR APPLICATIONS

| | | | |
|---|---|---|---|
| 21,081 | 2/1900 | Switzerland | 156/420 |

*Primary Examiner*—William A. Powell
*Assistant Examiner*—John E. Kittle
*Attorney, Agent, or Firm*—F. W. Brunner; R. S. Washburn

[57] ABSTRACT

A tire building drum particularly useful for mounting a tire carcass while winding tread compound in narrow and/or thin strips therearound to build up the tread portion of the tire. The drum has a multiplicity of narrow tire support members or segments each one of which is supported and moved radially by two pairs of links which form triangular wide-based columns. Each of the links extend from a pivot connecting its radially inner end to the drum center shaft, outward and through a guiding slot in a link support tube fixed coaxially of the shaft, to a radially outer pivot mounted on the respective segment. In an alternative construction, the pairs of links are extended, and connected to the support members by additional pairs of links to extend the range of radial movement of the support members. The drum disclosed is capable of accommodating a wide range of tire carcasses differing in bead diameters and/or in section widths without need for removal or replacement of parts.

The foregoing abstract is not to be taken as limiting the invention of this application, and in order to understand the full nature and extent of the technical disclosure of this application, reference must be made to the accompanying drawing and the following detailed description.

6 Claims, 4 Drawing Figures

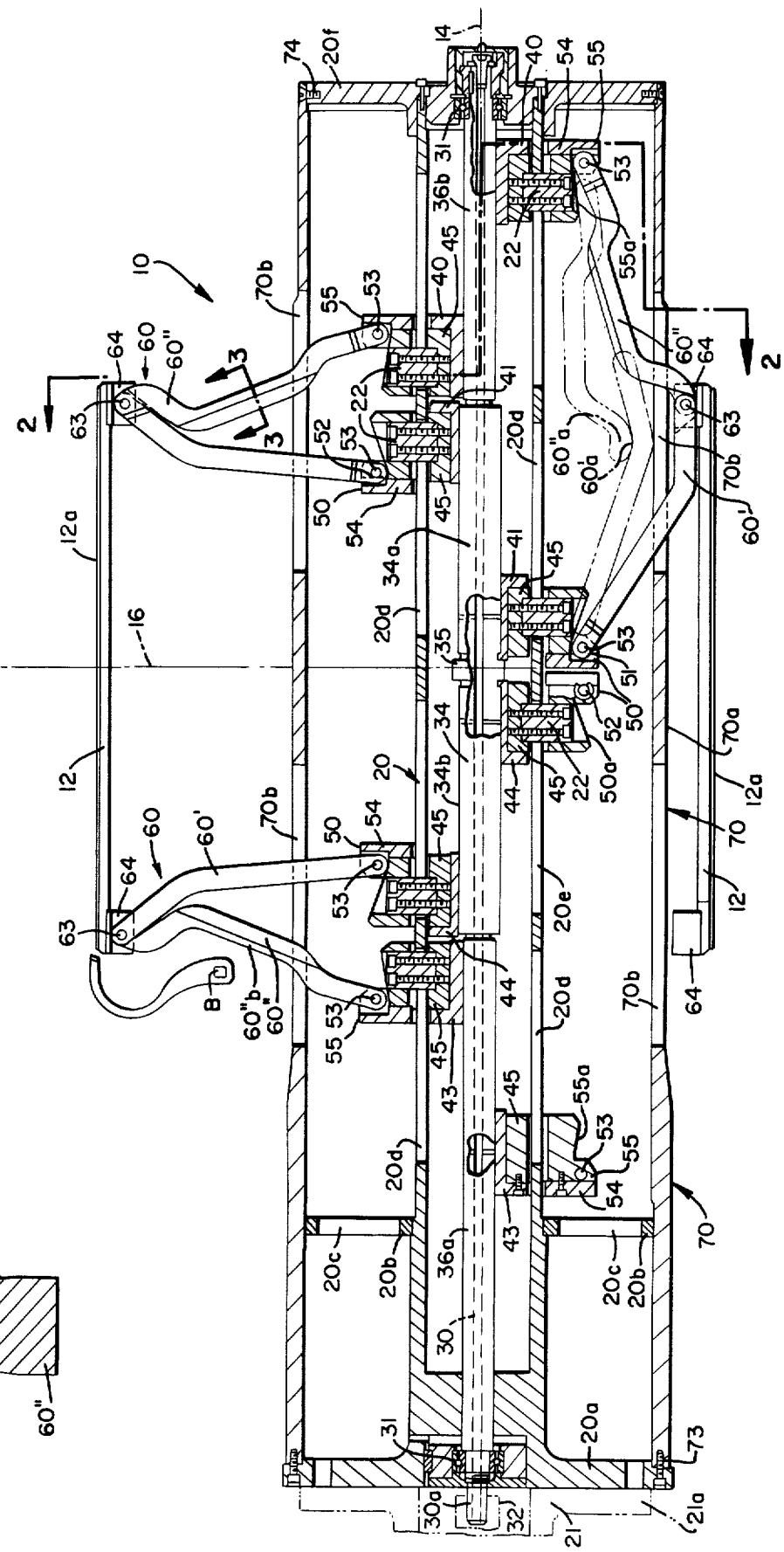

TIRE BUILDING DRUM

This invention relates to tire building, particularly to a tire building drum having an improved range of expansion and collapse between maximum and minimum outside diameters. A tire building drum in accordance with the invention has particular utility in supporting a tire carcass previously built on a firststage tire building machine and to which carcass tread compound is to be applied in a continuing plurality of turns thereabout to build up a desired tread form.

In tire building drums or forms heretofore available, it has been generally required to alter certain fixed dimensions of the drum to set up the same to accommodate a tire carcass of dimensions differing in bead diameter or section width or crown from the last tire built thereon. Conventionally, this is accomplished by adding or removing spacers to adjust the face width of the drum, that is, of the axial length of the cylindrical tire building surface. Likewise, to accommodate tires of differing crown and/or bead diameter, diametral spacers were added to or removed from the drum in order to change the maximum outside diameter thereof. The time required for such alterations to the drum is essentially non-productive and therefore expensive in time and in manual effort and ways and means to overcome the cost have long been sought.

An object of the present invention therefore is to provide a tire building drum capable of overcoming or at least minimizing such expenditure of time and effort.

Broadly and briefly stated, the present invention, the scope of which is particularly and distinctly expressed in the appended claims, provides a tire building drum having a multiplicity of tire support members or segments extending parallel to the drum axis in a cylindrical array about a drum center shaft which can be mounted on a conventional tire machine spindle. Each member is supported by and movable toward and away from the center shaft by two pairs of links each of which links is pivotally attached to the member outwardly of the mid-plane of the drum and near the respective ends of the associated tire support segments. Each of the links of each pair is pivotally mounted on a respectively associated trunnion ring carried by the center shaft. Operating means preferably within the center shaft are operable to move the respective trunnion rings axially of the shaft such that the respective pairs of trunnion rings move axially equally and symmetrically oppositely of one another. Preferably, although optionally, according to the invention, means for supporting each of said links in axial planes equiangularly spaced about the axis is provided by a link support tube the cylindrical wall of which has a plurality of guide slots extending axially thereof each slidably engaging the respectively associated links intermediate their radially inner and outer ends.

The invention will be better understood by persons skilled in the art from the following description of preferred embodiments of the invention which represent the best mode presently contemplated by the inventor which description is by way of illustation but not of limitation, and which description includes and makes reference to the attached drawings in which:

FIG. 1 is a section view taken on the drum axis, the portion above the horizontal center line or axis illustrating the drum according to the invention in a radially expanded state, and the portion below the axis illustrating the drum in its radially collapsed state;

FIG. 3 is a section view showing a detail of the drum, taken on the line 3—3 in FIG. 1.

Figure 2:
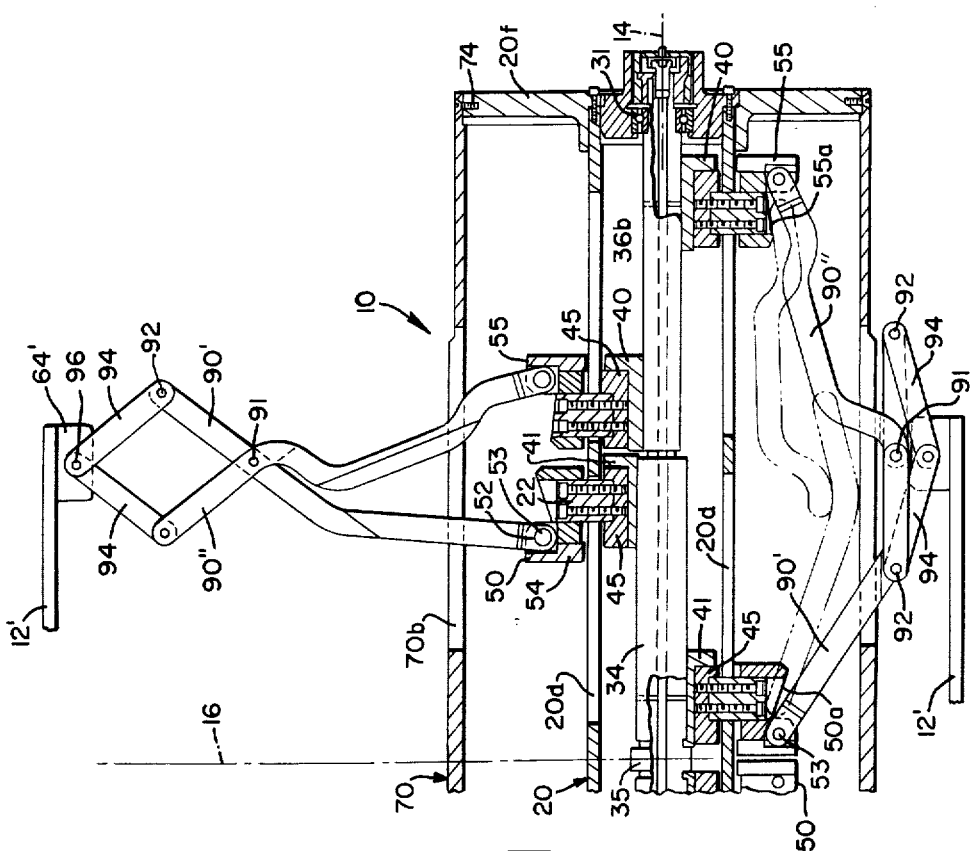
FIG. 2 is a cross-section view taken normal to the axis as indicated by the lines 2—2 in FIG. 1.

In the drawings, and more particularly in FIGS. 1 and 2, there is illustrated by way of example a presently preferred embodiment of the invention. The drum 10 there shown comprises a plurality of tire support members 12, commonly called segments, which extend lengthwise in the direction of the axis 14 of rotation of the drum and are arranged in a cylindrical array coaxially of the axis. The respective members extend in the axial direction equidistantly from a plane 16 normal to the axis of the drum which plane is often referred to as a mid-circumferential plane. In the normally preferred practice of building tires, the midcircumferential plane of a tire is located in coincidence with such plane which herein, for brevity, is referred to as the mid-plane 16.

In normal use of the drum 10, the support members 12 engage only a central circumferential zone of the inner surface of the tire carcass and do not, as does the conventional tire building form, contact the bead portions and adjacent portions of the sidewalls of the carcass.

The radially outward surfaces 12a of the members, of which there are 36 in the present embodiment cooperate to provide firm and substantially cylindrical support for operations on a tire being built thereon such as, for example, to withstand the radial loads imposed by stitching, wherein the components of the tire being built are consolidated to form an integral tire structure. The drum 10 includes a hollow elongate central shaft 20 having at one end an integrally attached mounting flange 20a. The flange is arranged and constructed for being mounted coaxially and corotatably on a conventional tire building machine spindle 21 from the flange 21a of which the shaft 20 extends outwardly as a cantilever. Optionally, for purposes presently to be discussed, the center shaft 20 has fixed thereon a support flange 20b from which much of the weight has been removed by conventional lightening holes 20c. A plurality of axially elongate slots 20d are formed in the wall 20e of the center shaft, each of which slots slidingly accommodates a key 22. Each key is permitted to slide axially of the drum in its respectively associated slot but is prevented from significant angular displacement about the drum axis 14.

Means for providing radial movement of the respective tire support members is provided in the presently preferred embodiment by an operating shaft 30 which is mounted coaxially for rotation relative to the center shaft by conventional bearings 31 fitted in the respective ends of the center shaft 20. The operating shaft 30 has a drive connection 30a at its end adjacent the flange 20a for connection with the conventional actuating drive 32 provided within the tire building machine spindle 21. The operating shaft has a central portion 34 which extends symmetrically outward axially of the mid-plane 16, which central portion is divided into two parts 34a,34b one of which is provided with lefthand lead threads, the other of which is provided with righthand lead threads. Between the two threaded parts a section 35 of enlarged diameter provides respective abutment faces equidistant axially from the mid-plane.

The operating shaft 30 has also a pair of end portions 36a,36b each of which extends outwardly axially from the central portion 34 and is integral with such central portion. The respective end portions are theaded one at a righthand lead and the other at a lefthand lead, the end portion extending outward from that part of the central portion having a righthand lead has a lefthand lead thread and the end portion extending outwardly from the part of the central portion having the lefthand lead being threaded with a righthand lead. The respective end portions each have outside diameters smaller than the outside diameter of the central portion. The pitch and the lead of the threads of the central portion and of the end portions (the thread lead meaning the distance of the advance of a nut effected by a single 360° rotation of the operating shaft) are equal; the hands (meaning the direction of advance of the associated nut) are opposite, as has been described.

A first pair of nuts 40,41 disposed axially outboard (that is, beyond the mid-plane 16 from the flange 20a and spindle 21 and toward the right as seen in FIG. 1) are cooperably engaged respectively one with the threaded end portion 36b of the operating shaft, the other with the oppositely threaded part 34a of the central portion of the operating shaft, the arrangement being such that the nuts 40,41 move equally and oppositely of each other in response to rotation of the operating shaft 30.

A second pair of nuts 43,44 are disposed inboard (that is, between the mid-plane 16 and the flange 20a) and are cooperatively engaged respectively with the threaded inboard end portion 36a and with the adjacent threaded part 34b of the central portion such that the respective nuts 43,44 move equally and oppositely of each other in response to rotation of the operating shaft 30. The arrangement is such that the two nuts 41,44 engaged with the respective threaded parts 34a,34b of the central portion also move equally and oppositely of each other in response to the rotation of the operating shaft 20.

In order to adjust the timed relation between the respective pairs of nuts, each nut is fitted within a rigid ring 45 and suitably adjusted angularly with respect to the operating shaft 20 after which it is secured in fixed relation to the respectively associated ring 45.

A first pair of trunnion rings 50 are mounted slidably on the outer cylindrical surface 20e of the center shaft and are fixed rigidly each to the respectively associated ring 45, by way of the previously mentioned key 22 which is secured to the ring 45 by the cap screws and fitted snugly in a key seat of the trunnion ring in the manner illustrated in FIG. 1, and thereby to the nuts operably engaged with the respective parts 34a,34b of the central portion of the operating shaft 20 such that each trunnion ring and nut moves toward or away from the other in response to the rotation of the operating shaft. The second pair of trunnion rings 55 are also mounted slidably on the cylindrical outer surface 20e of the center shaft and are fixed rigidly to a ring 45 and the respectively associated nut in an identical manner.

Each of the trunnion rings 50,55 is formed with a plurality of recesses 51 opening radially and axially thereof and with a semi-toroidal groove 52 formed annularly concentrically therein and intersecting the recesses 51 as may be seen in FIG. 1. The each groove accommodates a circumferential row of link pivot pins 53 which are retained in the groove by a pin-retaining plate 54 removably fixed on the trunnion ring.

In order to move the tire support members 12 or segments radially with respect to the drum axis 14 and to provide for each of said members a wide-based triangular column-like support, in all radial positions of the member, a pair of links 60 comprising a single off-set link 60' and a double off-set link 60'', are connected pivotally at their respective inner ends, by the previously mentioned pivot pins 53 to the respective trunnion rings 50 or 55 and at their radially outer ends to a common pivot pin 63 carried by a pivot pin mounting 64 fixed axially outwardly of the mid-plane on a radially inward surface of the respectively associated support member 12. A second identical pair of links 60 are disposed in mirror-image fashion with respect to the mid-plane 16 and are pivotally secured in an identical manner to the pivot pin mounting 64 fixed axially equidistantly outward from the midplane oppositely from the first such mounting. Two pairs of links so described are attached to each of the tire support members. Each member is thereby maintained parallel to the drum axis throughout its range of movement toward and away from the axis.

In order to support the respective pairs of links and enhance their columnar stiffness as well as minimize angular displacement relatively of the drum axis, a link-support tube 70, having a cylindrical wall 70a spaced radially outwardly of the center shaft 20 and radially inwardly of the respective tire support members 12 is provided with a plurality of slots 70b extending axially thereof in a plurality of axially spaced sets in which the respective slots are equally spaced around the tube and individually are aligned with the corresponding slots in the others of such sets. Each of the slots slidably accommodates one of said pairs of links 60 and serves to maintain such pairs of links in their appropriate axial planes, in the manner more clearly illustrated in FIG. 2.

The link support tube 70 is fixed coaxially of the center shaft 20, being secured rigidly to the flange 20a at the inboard end and to an outer flange 20f removably affixed to the center shaft adjacent the outboard end thereof. The previously mentioned flange 20b can be provided to assist in the assembly of the link-support tube during its movement axially along the center shaft.

The mentioned assembly of the link support tube is facilitated by providing on the respective trunnion rings 50,55, link abutment surfaces 50a,55a which are inclined angularly with respect to the drum axis such that when the respective trunnion rings are positioned as indicated (FIG. 1) by the phantom outlines, the radially outer end 60''a of the double offset link can be nested in the curve 60'a of the single offset link as seen in FIG. 1. This disposition of the links, during assembly, is retained simply by a removable tape or rubber band such that the link support tube 70 can be moved coaxially over all of the links 60 to the assembled position seen in FIG. 1. The axial slots 70b in the link support tube are then aligned with the respectively associated links and the tube is secured by the cap screws 73 to the flange 20a and similarly to the outboard flange 20f by the cap screws 74. The respective links are then swung outwardly to extend through the respective slots after which their respective radially outer ends are secured pivotally in pairs 60 to each other and to the pivot pin mountings 64 of the associated tire support member 12.

In the upper lefthand portion of FIG. 1, successive positions of the previously referred to double offset link 60'' are illustrated and are typical of each such double offset link. It will be noted that the offset of the link 60'' provides two advantages.

Firstly, the double offset surface 60''b of the link is disposed axially inwardly free of interference with the bead portion B of a minimum width tire carcass to be treated on the drum 10. Secondly, the location and amount of the offset enables the link 60'' to move through an associated slot 70b the length of which in the axial direction is less than would be the case with a straight link connecting the pivot pins 53 and 63. By so providing a shorter axial slot, the support against angular displacement of the links 60 in use of the drum is rendered more effective.

The intermediate length portion of the double offset link can be beveled, as seen in FIG. 3, to enable the links 60'' in their closed position to assume a smaller diameter.

The single offset link 60' is angularly offset, as may be seen in the lower right portion of the drum in FIG. 1 to lie at least approximately parallel with the associated tire support member 12 while the drum is in its fully collapsed position. This angle of offset also accommodates the offset of the associated double offset link while the drum is in its fully extended position as can be seen in the upper portion of FIG. 1.

The radially outer end portions of the respective single and double offset links are reduced in thickness, as shown at 80 in FIG. 2, relative to the remainder of the respective links, equally and oppositely such that the two links can move pivotally, with the axially and radially extending surfaces c and d of the links 60' and 60'' coplanar with each other.

Figure 4:
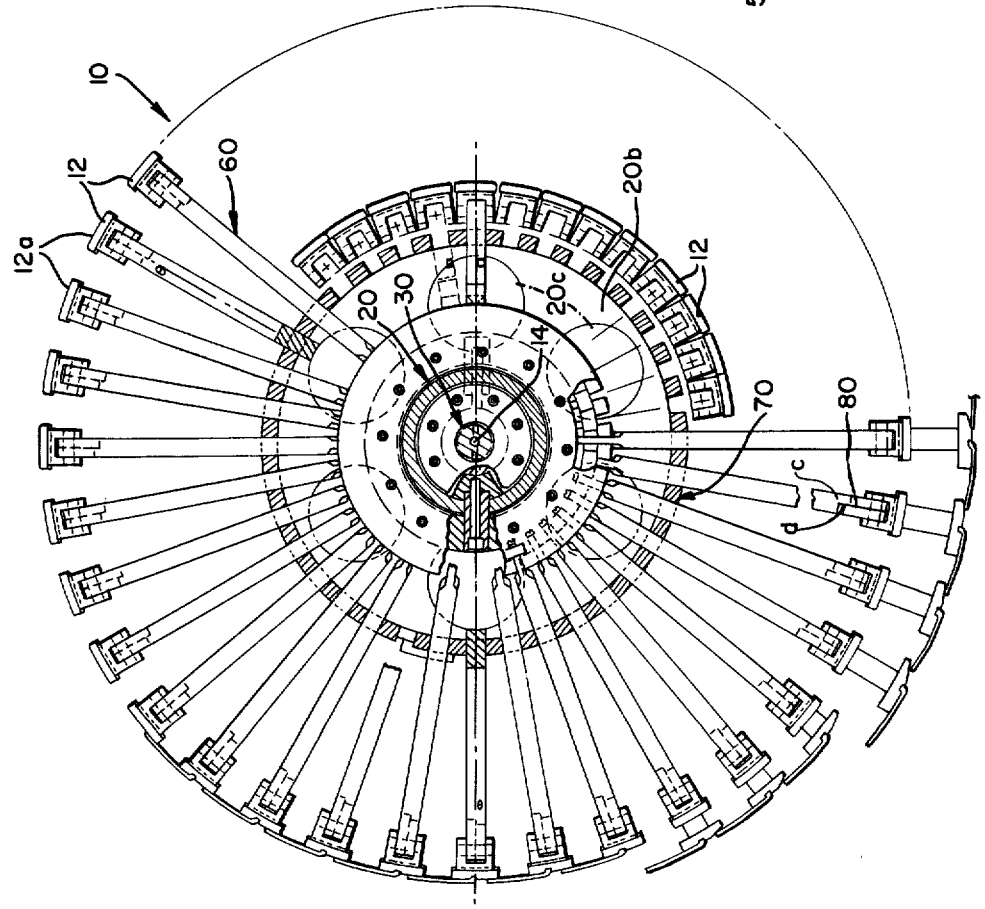
FIG. 4 is a partial axial section view illustrating a further embodiment of the invention, the same being a modification of the drum illustrated in FIG. 1.

A further embodiment of the invention is illustrated in FIG. 4. The enhanced stability of the tire support members attributable to the triangular columnlike support by the respective pairs of links 60 and the angular support furnished by the link support tube 70 can be exploited further by substituting for the links 60 of FIG. 1, respectively, the links 90' and 90'' illustrated in FIG. 4. In the embodiment of FIG. 4, the links 90' and 90'' are connected, not at their radially outward extremities, but rather intermediately of the respective inner and radially outer ends thereof by a pivot pin 91. The respectively radially outward extending portions each have in the outer end thereof a pivot pin 92. To the respective pivot pins 92 are connected a further pair of simple links 94. These latter links 94 are then connected pivotally in pairs each by a pin 96 carried in a pivot pin mounting 64' attached to the radially inner surface of the tire support member 12' in the manner hereinbefore described. It will be apparent from the foregoing that the change of radius of the tire support members from the drum axis is larger in the arrangement of FIG. 4 than the already large change available in the drum of FIG. 1. The drum of FIG. 4 is, except as to the pairs of links 90' and 90'', and 94, as described herein with reference to FIG. 1.

While the crown, which is to say the rise and fall of the tire support members 12 (or 12') relative to the drum axis, is established in the construction of any particular drum in accordance with the invention, it will be apparent that the maximum diameter can be increased in accordance with conventional practice by adding spacer blocks and that the axial face width of the drum can be increased by the addition of wing portions in known manner.

Advantages

The large number of tire support members or segments results in correspondingly narrower gaps between the members when the drum is expanded. Such gaps can be readily bridged by conventional, but narrower, cover plates to provide satisfactorily continuous circumferential surfaces.

The provision of the link-support tube according to the invention not only enables the radially extending links to provide stiffer support for the drum surface, but enables a greater number of more slender links, and thus a larger number of support members, as well as a greater range of radial movement, without sacrifice of the desired stiffness. The link-support tube also provides very satisfactory resistance to angular displacement of the support members about the drum axis.

The drum according to the invention provides, without removing or replacing parts, a greater range of change of radial and diametral dimension, and can thus accommodate tires of widely varying crown height, and bead diameters, one after another, without setup delay. The maximum diameter and the maximum face, or axial length, can of course be icreased by applying to the support members the usual spacers, as desired. In the drum 10 described, the range of radial movement of the support members relative to the drum axis is in excess of 7 inches. This drum can accommodate a tire carcass having a bead diameter as small as 24 inches with a crown of 12 inches (crown being the difference in diameter of the carcass at the mid-plane from the diameter of the sole or radially inner surface of the bead) and, without addition or spacers, a bead diameter of 34 inches with a crown of 2 inches, as well as any tire carcass having dimensions between those mentioned.

While certain representative embodiments and details have been shown for the purpose of illustrating the invention, it will be apparent to those skilled in the art that various changes and modifications may be made therein without departing from the spirit or scope of the invention.

What is claimed is:

1. A tire building drum useful for processing tire carcasses having a nominal bead diameter range from 24 to 36 inches and to accommodate tire carcasses previously built on forms having radial heights or crown ranging from 1 to 12 inches, comprising in combination:

a plurality of tire support members extending lengthwise in the direction of the axis of the drum in cylindrical array coaxial with said axis an engageable with the interior surface of said tire only in a central circumferential zone thereof spaced inwardly from each of the bead portions of such tire being continuously adjustable between limiting diameter positions, respectively, nearer to and farther from the axis;

a pair of pivot pin mountings fixed on radially inward surfaces of each of the support members near the respective axial ends thereof and equidistantly from the mid-plane of the drum, each mounting accommodating a link pin;

a hollow elongate center shaft having at one of its ends a flange mountable for coaxial corotation on a tire building machine spindle and having a plurality of slots extending through the wall thereof and lengthwise thereof parallel to the drum axis;

an operating shaft mounted rotatably and coaxially in said center shaft and having a drive connection at its end adjacent said flange for rotating the operating shaft relatively of the center shaft;

said operating shaft having a central portion extending symmetrically outward axially of said mid-plane and a pair of end portions extending respectively oppositely outward axially from said central portion, the central portion having a threaded part with righthand threads in one direction from said mid-plane and a part with lefthand threads in the other direction from said mid-plane, both righthand and lefthand thread parts being of equal predetermined pitch and lead, and the respective end portions being threaded one righthand and the other lefthand at said predetermined pitch and lead, said one righthand end portion being adjacent said lefthand thread part of the central portion and said lefthand end portion being adjacent said righthand thread part of the central portion;

said end portions having outside diameters less than the outside diameter of the central portion of the operating shaft, said operating shaft having a stop collar disposed thereon symmetrically of said mid-plane and between the righthand and the lefthand part;

a pair of nuts operatively engaged respectively with one of the end portions of said operating shaft and with the adjacent threaded part of said central portion such that said nuts move equally and oppositely of each other in response to rotation of said operating shaft relatively of said pair of nuts;

and another pair of nuts operatively engaged respectively with the other said end portion and with the adjacent threaded part of said central portion such that said nuts move equally and oppositely of each other in response to rotation of said operating shaft relatively of said other pair of nuts and such that the nuts engaged with the respective threaded parts of the central portion also move equally and oppositely in response to said rotation;

a cylindrical, link-support tube fixed coaxially of said central shaft, spaced radially outwardly and extending axially thereof, said tube having a plurality of axially extending slots opening through the cylindrical wall of the tube, such slots being arranged in axially spaced sets of slots equally spaced around said tube and individually aligned axially with corresponding slots of the other such sets;

a pair of trunnion rings mounted coaxially about end slidably on said center shaft and associated with said central portion of the operating shaft, each ring having a key fixed thereon and to a respectively associated one of said nuts operatively engaged on said central portion, each said key being slidable in the associated one of the slots in said center shaft;

a second pair of trunnion rings mounted coaxially about and slidably on said center shaft, each being associated respectively with one of said end portions of the operating shaft;

each of said trunnion rings having a plurality of recesses spaced circumferentially therearound and a semitoroidal annular groove therein intersecting said recesses and concentric with the drum axis, a circumferential row of link pivot pins disposed end-to-end in said groove, a pin-retaining plate removably affixed on each said trunnion ring retaining said pivot in said groove; and a pair of links each link thereof being pivotably connected at its radially inner end to a respectively associated one of said trunnion rings and each link extending radially outwardly through and slidable in a respective one of the slots in said link-support tube, there being a plurality of said pairs of links each said pair being operatively associated with a respective one of said pivot pin mountings.

2. A tire building drum as claimed in claim 1, each link of each said pair thereof being pivotally connected at its radially outer end to a respective one of said pivot pin mountings.

3. A tire building drum as claimed in claim 1, each of said pairs of links being pivotally connected to the other thereof intermediate the respective radially inner and radially outer ends thereof and radially adjacent said cylindrical link-support tube, there being at least one additional pair of links operatively associated with each said pivot pin mounting at their respective radially outer ends and at their respectively radially inner ends with the respective radially outer end of each link of the first said pair thereof.

4. A tire building drum for processing a variety of tire carcasses of differing dimensions, comprising in combination:

a plurality of support members arranged coaxially about the drum axis;

a center shaft having means for mounting the drum coaxially and corotatably on a tire machine spindle;

an operating shaft mounted coaxially in and rotatable relatively of said center shaft;

said operating shaft having a plurality of pairs of righthand and lefthand lead threaded portions disposed in alternating sequence therealong;

a pair of nuts operatively engaged respectively with each pair of right and lefthand threaded portions of said operating shaft;

a link support tube having axially extending slots therein fixed coaxially of and radially spaced outwardly from said center shaft;

a trunnion ring fixed to and movable axially with each nut of said pair thereof in response to the respective right and lefthand lead threads of said portions; and a pair of links connected pivotally to each other and to each said support member symmetrically outwardly of said mid-plane, the radially inner ends of each link of each pair thereof being pivotally connected to a respective one of said trunnion rings for movement therewith toward and away from each other such that two pairs of links associated with each said support member provide therefor two wide-based triangular column-like supports for each said member in all radial positions thereof, and each of said links being slidable in one of said slots.

5. A tire building drum comprising in combination a multiplicity of tire support members extending in cylindrical array parallel to the drum axis and movable radially toward and away from said axis, a center shaft mountable on a tire building machine spindle, two pairs of links each link of which is pivotally connected to the respectively associated tire support member and to the other link of such pair, two pairs of trunnion rings mounted on and movable axially along said center shaft, each of said links being connected pivotally at its radially inward end to a respectively associated one of said trunnion rings, operating means for moving one pair of said trunnion rings in one axial direction, the other pair of trunnion rings equally and simultaneously in an opposite axial direction in symmetrically timed relation, and further comprising link support means constructed and arranged to engage each of said links intermediately of the respective radially inner and radially outer ends thereof for maintaining said pairs of links in equiangularly spaced axial planes associated respectively with said tire support members.

6. A tire building drum having a multiplicity of tire support members movable radially toward and away from the drum rotation axis, said drum comprising in combination a center shaft having means fixed thereon for mounting said drum coaxially and corotatably on a conventional tire building machine spindle; two pairs of links pivotally attached to each of said tire support members each of said pairs of links being constructed and arranged to provide a wide-based, triangular, column support for such member, and spaced oppositely axially outwardly of the drum mid-plane in all radial positions of the respective members; and means disposed in said center shaft and operatively connected to each of said links for moving simultaneously respective radially inner ends of one link of each pair in one axial direction and the respective radial inner ends of the other link of each pair in a respectively opposite axial direction and the respectively radially inner ends of the other link of each said pair axially oppositely of each other, and further comprising a link support tube having a cylindrical wall spaced radially outwardly of said center shaft and radially inwardly of said support members and a plurality of slots extending axially thereof, each of said slots slidably accommodating one of said pairs of links, said tube being fixed rigidly and coaxially on said center shaft and supporting said pairs of links in their respective axial planes.

* * * * *